Patented May 28, 1946

2,401,015

UNITED STATES PATENT OFFICE 2,401,015

CEMENT

John L. Perkins, Arlington, Mass., assignor to B. B. Chemical Co., Boston, Mass., a corporation of Massachusetts No Drawing. Application November 2, 1944, Serial No. 561,639

2 Claims. (Cl. 260—27)

This invention relates to liquid adhesive compositions embodying plastic polymerized chloroprene and zinc-calcium resinate, and to a laminated article the layers of which are held together by the use of said composition.

Plastic polymerized chloroprene is chloroprene (also known as chloro-2-butadiene-1,3) which has been polymerized to such an extent that it may be worked on the rolls of a rubber mill and compounded with other ingredients in a manner similar to that in which crude rubber is treated. Polymerized chloroprene is an adhesive in that films deposited from a solution of it upon articles, such for example as those of leather or fabric, become tacky as the solvent evaporates, remain tacky for a comparatively short interval (in the neighborhood of about half an hour), and, when pressed firmly together during that interval, will become strongly bonded. The tack or stickiness, however, is not in some instances of a sufficiently high degree, and in any event does not last for any considerable interval.

It is desirable in some instances to provide a liquid adhesive composition such that films deposited upon articles to be bonded will be strongly tacky and will retain this tack practically unimpaired for a comparatively long interval, and such that the bond produced at once by pressing two coatings or films together at any time during said interval, which may be 24 hours or longer, will produce a bond of high strength, for example a bond of a strength equal to that produced by tacky polymerized chloroprene alone.

At one stage in the manufacture of Goodyear welt shoes, it is customary to cement a sole to the bottom of a lasted and welted shoe. This operation is known as sole laying, and its purpose is to locate the sole properly in place and to hold the sole firmly in place during the subsequent rough rounding and outsole stitching operations. The sole-laying operation is carried out by depositing a liquid adhesive composition upon the sole and upon the bottom of the shoe, permitting the composition to dry until tacky films result, then locating or "spotting" the sole on the bottom of the shoe using manual pressure, and then pressing the sole firmly against the bottom of the shoe, usually by means of a sole laying machine. Ordinarily from one-half to about one hour of air-drying is required before a film of cement which is suitably tacky results; and it is the general object of the present invention to provide a cement which will remain strongly tacky for a comparatively long interval, and will be effective at any time during this interval to produce, immediately the sole and shoe are pressed together, a bond strong enough to hold the sole firmly in place during the subsequent rough rounding and outsole stitching operations. When the sole is located upon the bottom of the shoe, usually manually, the surfaces to be joined, that is the deposited films on the sole and on the shoe, should be strongly tacky so that once the sole is properly located or "spotted" on the bottom of the shoe it will remain in place while the sole and shoe are placed in the sole laying machine and firmer pressure applied.

Films of polymerized chloroprene, made by depositing them from a solution and then drying them, are not as strongly tacky as is sometimes desirable and in any event the tack does not last for any considerable interval. It is possible to increase the tack and prolong the interval by adding certain compounds which are compatible with polymerized chloroprene, such for example as rosin; but the bond produced by pressing together two tacky surfaces of this kind, provided that enough of the compound has been added to produce a strong and lasting tack, is too weak for the desired purpose, being much weaker, for example, than is the bond produced by using polymerized chloroprene alone. Hitherto, then, compounds which could be added to or mixed with polymerized chloroprene in an amount sufficient to increase the tack and prolong the tacky interval to the desired degree, have had the effect of weakening the bond which is produced by pressing the tacky surfaces together.

I have found that zinc-calcium resinate in various considerable amounts and polymerized chloroprene can be dissolved in a common solvent to produce the desired liquid adhesive composition. Films deposited from such a composition and dried for an interval have a strong tack which lasts for a long interval; and, when the tacky surfaces of such films are pressed together at any time during said interval, a sufficiently strong bond results immediately. In short, various large amounts of zinc-calcium resinate may be added to the polymerized chloroprene to increase the tack and prolong its effective interval without adversely affecting the strength of the bond.

An example of a liquid adhesive composition according to the present invention is as follows:

| | |
|---|---|
| Polymerized chloroprene_____pounds__ | 9.50 |
| Zinc-calcium resinate_____do____ | 2.85 |
| Solvent _____gallons__ | 4 |

The solvent of the above may be

| | Per cent by volume |
|---|---|
| Ethyl acetate _____ | 58.5 |
| Naphtha _____ | 31.5 |
| Toluol _____ | 10. |

The polymerized chloroprene may be prepared in the manner described in United States Letters Patent No. 1,950,436, granted March 13, 1934, upon an application of Ira Williams. Zinc-calcium resinates differ in their properties, those which are referred to herein being such as are disclosed in United States Letters Patent Nos. 2,346,993 and 2,346,995 of April 18, 1944. These resinates differ in the proportions of zinc and calcium which they contain, according to the amounts of zinc and calcium which are combined with the acid or acids of the rosin. A very desirable resinate contains from about 5% to 9% by weight of combined zinc and from about .8% to 1% of combined calcium, the preferred resinate being that marketed by Newport Industries Inc., of Pensacola, Florida, under the trade name of Zirex, said resinate containing about 8.40% of combined zinc and about .7% of combined calcium, having a melting range of about 130° C. to 135° C. and being a permanently refusible resin-like product. The zinc-calcium resinate of the formula given above is present in an amount equal to 30% by weight of the polymerized chloroprene. It may be present in various amounts from about 10% to about 40%. The amount of solvent remains the same irrespective of the amount of resinate used. As to the solvent, any solvent common to the two solids may be used which will evaporate readily from a coating, examples of such solvents, aside from those given above, being hydrogenated naphtha and benzol.

In order to illustrate how the addition to the polymerized chloroprene of the zinc-calcium resinate for the purpose of increasing the tack and prolonging its interval does not decrease the strength of the bond, the following comparative tests were made.

Bond

|  | Control | 10% resinate | 20% resinate | 30% resinate | 40% resinate |
| --- | --- | --- | --- | --- | --- |
|  | Pounds | Pounds | Pounds | Pounds | Pounds |
| Unroughed strip | 10 | 11 | 13 | 12 | 11 |
| Roughed strip | 13¼ | 13 | 13 | 13½ | 13 |

For the "Control" the liquid composition was like that of the formula given above except that it contained no resinate. For the comparative test compositions there was used, for the one marked "30%," the composition of the formula and for those marked "10%," "20%," and "40%" the composition of the formula except that the percentage by weight of resinate to polymerized chloroprene was respectively 10%, 20% and 40%. The resinate of the tests given above was that marketed under the trade name of Zirex. The amount of solvent was the same for all.

The strips were made of sole leather one inch wide and three and one-half inches long with one coat of cement on each one of a pair, there being a heavier coat on the roughed strips than on the unroughed strips. The coats were dried for one hour at room temperature before assembly. The strips were assembled in pairs with their coated sides in contact and immediately subjected to pressure in a sole laying machine, the pressure being in the neighborhood of 114 p. s. i. The pairs of bonded strips were pulled apart by means of a Scott tester immediately after the application of the pressure for about 30 seconds. The compositions containing somewhat more than 40% and somewhat less than 10% give fair results; but the preferred range, as has been stated, is from about 10% to about 40%.

Although the liquid adhesive composition has been described specifically with respect to its use in the sole laying operation, it is not limited to such use.

Having described my invention, what I claim as new and desire to secure by Letters Patent of the United States is:

1. A liquid adhesive composition comprising plastic polymerized chloroprene and zinc-calcium resinate containing by weight from about 5% to 9% of combined zinc and from about .8% to 1% of combined calcium, the resinate being present in the proportion by weight of from about 10% to 40% of the polymerized chloroprene, the resinate and polymerized chloroprene being dissolved in a volatile organic solvent.

2. A liquid adhesive composition comprising plastic polymerized chloroprene and zinc-calcium resinate containing by weight about 8.40% of combined zinc and about .8% of combined calcium, the resinate being present in the proportion by weight of about 30% of the polymerized chloroprene, the resinate and polymerized chloroprene being dissolved in a volatile, organic solvent.

JOHN L. PERKINS.